Patented July 18, 1944

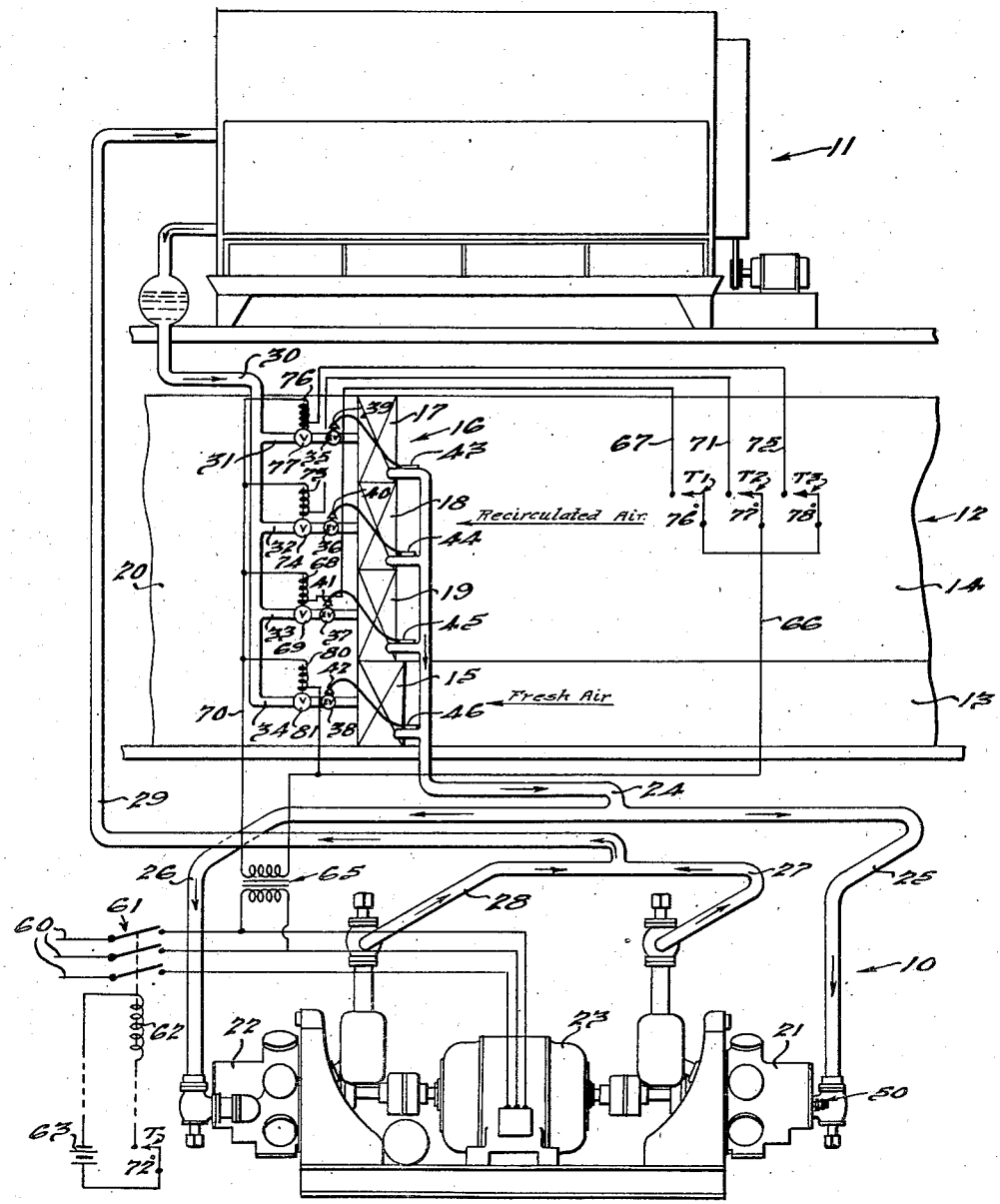

2,353,804

UNITED STATES PATENT OFFICE 2,353,804

AIR-CONDITIONING SYSTEM

Irving C. Baker and Rafael A. Gonzalez, Dayton, Ohio, assignors to Chrysler Corporation, Detroit, Mich., a corporation of Delaware Application February 14, 1941, Serial No. 378,964

9 Claims. (Cl. 62—6)

Our present invention relates to the art of air conditioning and comprises means whereby a more perfect condition may be maintained in a space being served by the air conditioning system than has been heretofore achieved. A further advantage of the present invention is that the maintenance of a more perfect condition is achieved through the use of simplified apparatus having the quality of operating economically.

Specifically, the present invention is an improvement upon the types of systems set forth and claimed in the patents to Thomas Chester, No. 1,791,751, issued February 10, 1931; No. 1,988,-264, issued January 15, 1935; and Reissue No. 20,650, issued February 8, 1938. In the aforesaid patents there is explained the functioning of air conditioning systems comprising means whereby a stream of air to be conditioned is separated into several streams for treatment by separate cooling means, each separate cooling means being under control of a thermostat or related apparatus whereby the number of streams being treated at any given instant varies in accordance with the temperature of some or all of the air being treated. The present invention utilizes the principle of the aforesaid patents in providing a plurality of evaporators extending across a duct through which recirculated air from the enclosure may be moved, each of said evaporators being under control of control means located in the duct or elsewhere whereby the number of evaporators having refrigerant fed therethrough may vary from time to time as the condition of the air being treated varies. In addition to this, it is contemplated in the present system that fresh air drawn into the enclosure should always be treated whenever the system is in operation since it is almost invariably true that the temperature or the humidity of the fresh air at such times as air conditioning is demanded is such as to require cooling or dehumidification.

The invention further comprises means whereby the treated fresh air, and the separate portions of the recirculated air stream, whether they are treated or untreated, mix before entry into the space being conditioned so as to cause the untreated portions of the air stream to temper the treated portions of the air stream. The invention further comprises means whereby the operating expense of the system is varied in accordance with variations of the load on the evaporators; or more specifically the invention comprises a variable capacity compressor having means whereby the capacity of the compressor, and hence the work done by the compressor, as well as the power required to operate the compressor, varies directly with the load on the evaporators.

More specifically the present invention comprises an air conditioning system including a fresh air duct through which fresh air may be moved and continuously treated at all times when the system is in operation, a recirculated air duct through which recirculated air may be moved and therein divided into a plurality of separate streams each traversing an individual evaporator, and means whereby the number of evaporators being served with refrigerant for cooling and dehumidification of recirculated air varies in accordance with the temperature of the recirculated air, so that at times all of the recirculated air may be treated and at times only a portion thereof or possibly none at all, the untreated portions thus serving to temper the treated portions as well as the fresh air; in combination with means whereby the capacity of the compressor serving the evaporators is automatically varied coextensively with the variations in the number of evaporators being served with refrigerant so as to provide a continuously operating system having an economical power consumption.

These and other objects and advantages of the present invention may be more fully realized from a study of the following specification taken in connection with the accompanying drawing wherein a preferred form of the invention is set forth in schematic fashion.

In the drawing, the figure represents an air conditioning system embodying the present invention, the parts thereof comprising the compressing unit 10, the condenser 11, and the air treating portion 12.

The air treating portion 12 preferably comprises separate ducts, such as the fresh air duct 13 and the recirculated air duct 14, the former being disposed as as to admit fresh air in constant volume at all times, and the latter being disposed so as to remove a constant volume of air at all times from the space being conditioned. The air passing through the fresh air duct is drawn through an evaporator 15 disposed entirely across the duct so as to treat all of the fresh air; and the air passing through the recirculated air duct 14 is drawn through a bank of coils 16 extending entirely across the recirculated air duct and comprising a plurality of evaporators 17, 18, and 19, each disposed so as to treat a separate portion of the recirculated air stream. All of the air then passes into a tempering duct or chamber 20 where the treated fresh air and all of the separate streams issuing from the evaporators 17, 18 and 19 mix so as to cause the untreated portions to temper the treated portions before the united air stream is served to the area to be conditioned. Movement of the air through the ducts and coils may be achieved by any type of blower means (not shown) as is well known in the art. It is a feature of the invention that no damper means are required for control of this system, it being operative at all times under the same pressure conditions and handling the same quantity of fresh and recirculated air.

Evaporators 15, 17, 18, and 19 are placed in parallel flow relation in parallel branches of a mechanical refrigerating system comprising the compressing unit 10 and the condenser 11. The compressor is of the automatic capacity varying type having various cylinders unloaded at times by a device responsive to changes in the suction pressure such as more fully disclosed in the patent to Charles R. Neeson, No. 2,185,473, issued January 2, 1940. As specifically shown in the present disclosure, the compressor comprises a plurality of cylinders which for convenience are disposed in two separate compressors 21 and 22 driven by a motor 23 having its shaft connected to the crankshafts of the compressors. The refrigerant compressed by the two compressors is returned from all of the coils into a common suction pipe 24 from which a branch 25 leads to compressor 21 and another branch 26 leads to compressor 22. For all practical purposes, therefore, the compressors 21 and 22 may be considered as a single compressor of fourteen cylinders instead of two separate compressors of seven cylinders each. Likewise, compressor 21 discharges into a discharge pipe 27, and compressor 22 discharges into a discharge pipe 28, both being connected to a single discharge pipe 29 leading to the condenser 11 so that again the two compressors may be considered as a single compressor.

The condenser 11 may be of any standard type, that shown being a standard evaporative condenser, although it may be liquid cooled or air cooled as conditions may vary, and the condenser discharges into a single liquid line 30 from which the parallel branches 31, 32, 33, and 34 feed refrigerant into the evaporators 17, 18, 19, and 15, respectively. Each evaporator is served through an expansion valve 35, 36, 37, and 38, respectively, under the control of valve motors 39, 40, 41, and 42, respectively, and superheat bulbs 43, 44, 45, and 46, respectively, as is usual practice in the air conditioning art. The variable orifices of the expansion valves contract and expand in order to prevent flooding or starving of the individual evaporators as the condition of the air traversing the evaporators varies.

As the temperature of the air traversing the evaporator drops, an effect is that the quantity of refrigerant fed through each of the evaporators also drops under control of the superheat bulbs. Therefore, more rarefied gas will be returned through the suction pipe 24 and less gas will be compressed by the compressors 21 and 22. With an ordinary type compressor the compressor would stop after a certain period of time, either under control of a low pressure cutout or a high pressure cutout as the case may be. With the present type of compressor, as fully explained in the aforesaid patent to Neeson, the compressor unloading means, indicated at 50, causes one or more of the cylinders of one or more of the compressors 21 and 22 to unload, thereby permitting the compressor to keep on operating although only a fewer number of cylinders than the total number are effective. This permits the power requirement of the motor 23 to fall off so that the power consumption will fluctuate directly as the load on the evaporators fluctuates. As this condition continues a point may be reached at which it becomes apparent that not enough refrigerant is traversing the evaporators to bring the temperature thereof down to a dehumidifying temperature, which, of course, is necessary with the fresh air treatment and may be necessary for a portion of the recirculated air, although it is also apparent that all of the air need not be treated or the temperature of the recirculated air would not be so low as to cause almost complete closing of the expansion valves 35 to 38, inclusive. Hence, we provide means to cause a rebalancing of the system to meet the new condition imposed on it due to the lessened load.

The foregoing means comprises control apparatus whereby the number of evaporators having refrigerant passed therethrough varies in accordance with the load on the system. For this purpose we provide a plurality of thermostat $T_1$, $T_2$, and $T_3$, which may be located in any convenient position in the enclosure or in the ducts, but which are preferably located in the recirculated air duct prior to the evaporators 17, 18, and 19. Each of these recirculated air thermostats is set to make contact at a different temperature, for example, 76°, 77°, and 78° F. These recirculated air thermostats are also located in parallel branches of a control circuit comprising the following: Power for the compressor motor may be supplied through power lines 60 having a motor starter switch 61 therein under control of a solenoid 62 placed in a circuit comprising battery 63 and thermostat T, which may be located at any desired control point, such as the outlet side of the air circulating system, the tempering duct 20, the entrance to the recirculated air duct 14, or the space to be conditioned. The thermostat T symbolizes a control means operative to start the compressor at the desired point and to stop the compressor when no air conditioning is required. In the present example it may be assumed to be located in the space to be air conditioned and to be set to make contact at 72° thereby to close the motor starter 61 and operate the air conditioning system. It is also to be understood that the air circulating means operates coextensively with the opertaion of the refrigeant circulating system.

The primary of a transformer 65 derives power from the loaded side of the power lines to the compressor motor, and the secondary thereof is connected by wire 66 to parallel branches in which the thermostats $T_1$, $T_2$, and $T_3$ are located. Thermostat $T_1$ makes contact with a wire 67 leading to solenoid 68 of a solenoid valve 69 placed in branch pipe 33 and then to the common return wire 70. Similarly, thermostat $T_2$ makes contact with a wire 71 leading to solenoid 73 controlling solenoid valve 74 placed in branch pipe 32 and then to the common return wire 70. Likewise, thermostat $T_3$ makes contact with a wire 75 leading to solenoid 76 of solenoid valve 77 in branch pipe 31 and then to common return wire 70. It can be seen from this circuit that the number of the evaporators treating recirculated air at any given time will vary in accordance with the temperature of the air approaching the evaporators. In the preferred embodiment thermostat $T_1$ is set to close at 76° F., $T_2$ at 77° F., and T₃ at 78° F., so that as the temperature of the air drops from above 78° to 78° evaporator coil 17 will be cut out of the refrigerant circuit, at 77° evaporator coil 18 will be cut out of the circuit, and at 76° evaporator coil 19 will be cut out of the circuit.

Since the fresh air usually always requires cooling or dehumidification, means are provided whereby the fresh air evaporator 15 is served with refrigerant at all times when the compressor is in operation, comprising a circuit including the secondary of transformer 65 and a solenoid 80 operating a solenoid valve 81 placed in branch pipe 34. It may be said that solenoid valve 81 is thus under control of thermostat T which starts the compressor operating, and hence the flow of refrigerant through the fresh air evaporator 15 is coextensive with the operation of the compressor.

The operation of the present invention is to provide a constant, correctly conditioned flow of air to the space to be conditioned. The fresh air is always cooled and dehumidified, and the recirculated air may be partly or entirely cooled and dehumidified or not treated at all. At the lower limit of conditions for which the system is designed to operate, it will be found at times that treatment of fresh air alone will be sufficient, the cooled and dehumidified fresh air being then tempered by entirely untreated recirculated air. The temperature of the stream of air issuing from the tempering duct 20 may at such times be in the neighborhood of 65° to 70°, the air being further tempered by mixture with air in the enclosure so that at the control point it may be at or slightly above 72°. On the other hand, on terrifically hot days each evaporator may be doing its utmost, and it might be found that the temperature of the air leaving the tempering duct 20 may be in the neighborhood of 78° or 80°, and in the neighborhood of the control thermostat T may be 81° or 82°. During weather intermediate of the two extremes it may be found that the number of evaporators operating upon the recirculated air fluctuates as the temperature of the recirculated air drops below 78° indicating that the temperature of the air issuing from the duct 20 may be between 70° and 75° and between 76° and 78° at the control thermostat T. Under any set of circumstances the system tries to maintain an output such that the temperature of the space being served is maintained at a comfortable differential below the outside temperature. This result is achieved partly by controlling the number of evaporators included in the refrigerant system as set forth above, and partly by the efficient operation of those evaporators remaining in the refrigerant system because of the unloading characteristic of the compressor.

Having illustrated and described the preferred form of our invention, it should be apparent to those skilled in the art that the same permits of modifications in arrangement and detail. All such modifications as come within the scope of the following claims are considered a part of our invention.

We claim:

1. An air conditioning system comprising a fresh air duct through which fresh air may be moved, an evaporator extending across all of said duct, a recirculated air duct through which recirculated air may be moved, a plurality of evaporators arranged in a bank extending across all of said recirculated air duct so that a portion of the air stream in said recirculated air duct passes through each of said evaporators, a tempering duct in which all of the air leaving said evaporators mixes, condensing means arranged to feed refrigerant in parallel to all of said evaporators, a variable capacity compressor arranged to compress refrigerant returned from all of said evaporators and to feed compressed refrigerant to said condensing means, automatic capacity regulating means for varying the capacity of said compressor in accordance with the condition of the refrigerant returned to said compressor, control means whereby the evaporator in said fresh air duct is fed refrigerant at all times when the compressor is in operation and only when it is in operation, and other control means whereby, when the compressor is in operation, and only when it is in operation, refrigerant may be fed into one or more of the evaporators in said recirculated air duct in response to the temperature of the recirculated air in said recirculated air duct.

2. An air conditioning system comprising a fresh air duct through which fresh air may be moved, an evaporator extending across all of said duct, a recirculated air duct through which recirculated air may be moved, a plurality of evaporators arranged in a bank extending across all of said recirculated air duct so that a portion of the air stream in said recirculated air duct passes through each of said evaporators, a tempering duct in which all of the air leaving said evaporators mixes, condensing means arranged to feed refrigerant in parallel to all of said evaporators, a variable capacity compressor arranged to compress refrigerant returned from all of said evaporators and to feed compressed refrigerant to said condensing means, automatic capacity regulating means for varying the capacity of said compressor in accordance with the condition of the refrigerant returned to said compressor, a valve controlling the flow of refrigerant through the evaporator in said fresh air duct, means to open said valve when said compressor commences operation and to close said valve when said compressor stops operating, a plurality of other valves each controlling the flow of refrigerant through one of the evaporators in said recirculated air duct, and means whereby said other valves may be selectively opened in accordance with the condition of the air being treated.

3. An air conditioning system comprising a fresh air duct through which fresh air may be moved, an evaporator extending across all of said duct, a recirculated air duct through which recirculated air may be moved, a plurality of evaporators arranged in a bank extending across all of said recirculated air duct so that a portion of the air stream in said recirculated air duct passes through each of said evaporators, a tempering duct in which all of the air leaving said evaporators mixes, condensing means arranged to feed refrigerant in parallel to all of said evaporators, a variable capacity compressor arranged to compress refrigerant returned from all of said evaporators and to feed compressed refrigerant to said condensing means, automatic capacity regulating means for varying the capacity of said compressor in accordance with the condition of the refrigerant returned to said compressor, a valve controlling the flow of refrigerant through the evaporator in said fresh air duct, means to open said valve when said compressor commences operation and to close said valve when said compressor stops operating, a plurality of other valves each controlling the flow of refrigerant through one of the evaporators in said recirculated air duct, and a control circuit controlling the opening and closing of said other valves including a plurality of thermostats individually controlling one of said other valves.

4. An air conditioning system comprising a fresh air duct through which fresh air may be moved, an evaporator extending across all of said duct, a recirculated air duct through which recirculated air may be moved, a plurality of evaporators arranged in a bank extending across all of said recirculated air duct so that a portion of the air stream in said recirculated air duct passes through each of said evaporators, a tempering duct in which all of the air leaving said evaporators mixes, condensing means arranged to feed refrigerant in parallel to all of said evaporators, a variable capacity compressor arranged to compress refrigerant returned from all of said evaporators and to feed compressed refrigerant to said condensing means, automatic capacity regulating means for varying the capacity of said compressor in accordance with the condition of the refrigerant returned to said compressor, a valve controlling the flow of refrigerant through the evaporator in said fresh air duct, means to open said valve when said compressor commences operation and to close said valve when said compressor stops operating, a plurality of other valves each controlling the flow of refrigerant through one of the evaporators in said recirculated air duct, and a control circuit controlling the opening and closing of said other valves comprising a plurality of thermostats each set to make contact at a different temperature and each controlling one of said other valves whereby the proportion of treated to untreated air leaving the evaporators in said recirculated air duct varies from time to time.

5. An air conditioning system including a fresh air duct through which fresh air may be moved and continuously treated at all times when the system is in operation, an evaporator in said fresh air duct, means supplying said evaporator with refrigerant whenever the system is in operation, a recirculated air duct through which recirculated air may be moved and therein divided into a plurality of separate streams, a plurality of evaporators in said recirculated air duct each treating one of said separate recirculated air streams, means whereby the number of evaporators in said recirculated air duct being served with refrigerant for treating the recirculated air varies in accordance with the condition of the recirculated air, so that at times all of the recirculated air may be treated and at times only a portion thereof or possibly none at all, a compressor connected to all of said evaporators for supplying refrigerant thereto, and means varying the output of refrigerant by said compressor in accordance with the load on all of said evaporators so that said compressor may operate continuously to supply refrigerant to the evaporators in said fresh air duct and whichever of said evaporators in said recirculated air duct may be required to treat the recirculated air thus eliminating on and off cycling of the compressor.

6. An air conditioning system comprising a first evaporator adapted to have a stream of fresh air flowing in thermal exchange relation therewith, a second evaporator comprising a plurality of refrigerant flow passes adapted to have a stream of recirculated air flowing in thermal exchange relation therewith, said plurality of refrigerent flow passes of the second evaporator being so arranged with respect to the direction of flow of the recirculated airstream as to be adapted to have each of said refrigerant flow passes in thermal exchange relationship with a portion only of the recirculated airstream, condensing means connected in parallel refrigerant feeding relationship to said first evaporator and all of the passes of said second evaporator, a variable capacity compressor arranged to compress refrigerant returned from said first evaporator and all of the passes of said second evaporator and to feed compressed refrigerant to said condensing means, automatic capacity regulating means for varying the capacity of said compressor in accordance with the condition of the refrigerant returned to said compressor, control means effective to permit refrigerant to flow through said first evaporator at all times when the compressor is in operation and only when it is in operation, and other control means effective when the compressor is in operation, and only when it is in operation, to permit refrigerant to flow through one or more of the passes of said second evaporator in response to the temperature of the recirculated air.

7. An air conditioning system comprising a first evaporator adapted to have a stream of fresh air flowing in thermal exchange relation therewith, a second evaporator comprising a plurality of refrigerant flow passes adapted to have a stream of recirculated air flowing in thermal exchange relation therewith, said plurality of refrigerant flow passes of the second evaporator being so arranged with respect to the direction of flow of the recirculated airstream as to be adapted to have each of said refrigerant flow passes in thermal exchange relationship with a portion only of the recirculated airstream, condensing means connected in parallel refrigerant feeding relationship to said first evaporator and all of the passes of said second evaporator, a variable capacity compressor arranged to compress refrigerant returned from said first evaporator and all of the passes of said second evaporator and to feed compressed refrigerant to said condensing means, automatic capacity regulating means for varying the capacity of said compressor in accordance with the condition of the refrigerant returned to said compressor, a valve controlling the flow of refrigerant through said first evaporator, means to open said valve when said compressor commences operation and to close said valve when said compressor stops operating, a plurality of other valves each controlling the flow of refrigerant through one of the passes of said second evaporator and means responsive to the temperature of the recirculated air for opening and closing each of said other valves.

8. An air conditioning system comprising a first evaporator adapted to have a stream of fresh air flowing in thermal exchange relation therewith, a second evaporator comprising a plurality of refrigerant flow passes adapted to have a stream of recirculated air flowing in thermal exchange relation therewith, said plurality of refrigerant flow passes of the second evaporator being so arranged with respect to the direction of flow of the recirculated airstream as to be adapted to have each of said refrigerant flow passes in thermal exchange relationship with a portion only of the recirculated airstream, condensing means connected in parallel refrigerant feeding relationship to said first evaporator and all of the passes of said second evaporator, a variable capacity compressor arranged to compress refrigerant returned from said first evaporator and all of the passes of said second evaporator and to feed compressed refrigerant to said condensing means, automatic capacity regulating means for varying the capacity of said compressor in accordance with the condition of the refrigerant returned to said compressor, a valve controlling the flow of refrigerant through said first evaporator, means to open said valve when said compressor commences operation and to close said valve when said compressor stops operating, a plurality of other valves each controlling the flow of refrigerant through one of the passes of said second evaporator, and a control circuit controlling the opening and closing of said other valves including a plurality of thermostats individually controlling one of said other valves.

9. An air conditioning system comprising a first evaporator adapted to have a stream of fresh air flowing in thermal exchange relation therewith, a second evaporator comprising a plurality of refrigerant flow passes adapted to have a stream of recirculated air flowing in thermal exchange relation therewith, said plurality of refrigerant flow passes of the second evaporator being so arranged with respect to the direction of flow of the recirculated airstream as to be adapted to have each of said refrigerant flow passes in thermal exchange relationship with a portion only of the recirculated airstream, condensing means connected in parallel refrigerant feeding relationship to said first evaporator and all of the passes of said second evaporator, a variable capacity compressor arranged to compress refrigerant returned from said first evaporator and all of the passes of said second evaporator and to feed compressed refrigerant to said condensing means, automatic capacity regulating means for varying the capacity of said compressor in accordance with the condition of the refrigerant returned to said compressor, a valve controlling the flow of refrigerant through said first evaporator, means to open said valve when said compressor commences operation and to close said valve when said compressor stops operating, a plurality of other valves each controlling the flow of refrigerant through one of the passes of said second evaporator, and a control circuit controlling the opening and closing of said other valves comprising a plurality of thermostats each set to make contact at a different temperature and each controlling one of said other valves whereby the proportion of treated to untreated recirculated air varies from time to time.

IRVING C. BAKER.
RAFAEL A. GONZALEZ.